(12) United States Patent
　　　 Valkonen

(10) Patent No.:　US 12,608,889 B2
(45) Date of Patent:　　Apr. 21, 2026

(54) AUGMENTED VIRTUAL TOUR

(71) Applicant: P2 Holding Oy, Jyväskylä (FI)

(72) Inventor: Mika Valkonen, Äänekoski (FI)

(73) Assignee: P2 Holding Oy, Jyväskylä (FI)

( * ) Notice: Subject to any disclaimer, the term of this patent is extended or adjusted under 35 U.S.C. 154(b) by 287 days.

(21) Appl. No.: 18/276,688

(22) PCT Filed: Feb. 11, 2022

(86) PCT No.: PCT/FI2022/050086
§ 371 (c)(1),
(2) Date: Aug. 10, 2023

(87) PCT Pub. No.: WO2022/175590
PCT Pub. Date: Aug. 25, 2022

(65) Prior Publication Data
US 2024/0135651 A1　　Apr. 25, 2024
US 2024/0233275 A9　　Jul. 11, 2024

(30) Foreign Application Priority Data

Feb. 17, 2021　(FI) ..................................... 20215159

(51) Int. Cl.
G06T 19/00　　　(2011.01)
G06F 3/16　　　(2006.01)

(52) U.S. Cl.
CPC ............ G06T 19/003 (2013.01); G06F 3/165 (2013.01); G06T 19/006 (2013.01)

(58) Field of Classification Search
CPC ...... G06T 19/003; G06T 19/006; G06F 3/165

USPC ......................................................... 345/419
See application file for complete search history.

(56) References Cited

U.S. PATENT DOCUMENTS

| | | | |
|---|---|---|---|
| 2009/0237510 A1 | 9/2009 | Chen et al. | |
| 2013/0094780 A1 | 4/2013 | Tang et al. | |
| 2016/0127690 A1 | 5/2016 | Kaehler et al. | |
| 2018/0115759 A1* | 4/2018 | Sawa ..................... | H04R 3/005 |
| 2018/0131907 A1 | 5/2018 | Schmirler et al. | |

(Continued)

FOREIGN PATENT DOCUMENTS

| | | |
|---|---|---|
| EP | 3318945 A2 | 5/2018 |
| JP | 2000259233 A | 9/2000 |
| JP | 2002281487 A | 9/2002 |

(Continued)

OTHER PUBLICATIONS

European Patent Office, Extended European Search Report, Application No. 22755628.98, Mailed Jan. 3, 2025, 1 pages.

(Continued)

*Primary Examiner* — Jin Ge
(74) *Attorney, Agent, or Firm* — Ziegler IP Group, LLC.

(57)　　　　ABSTRACT

A computer implement method includes obtaining a previously captured virtual tour data of a location, receiving real-time image data of a target object located within a field of view area of a camera, which target object is located in the same location wherein the virtual tour data was captured, analysing the real-time image data for detecting a deviation, and overlaying the real-time image data on an area of a virtual tour view for forming a mixed image virtual tour data, which area of the virtual tour view corresponds the field of view area, if the deviation is detected.

13 Claims, 9 Drawing Sheets

(56) References Cited

U.S. PATENT DOCUMENTS

| 2019/0266803 | A1 | 8/2019 | Anderson et al. |
| 2020/0374345 | A1 | 11/2020 | Yerli |

FOREIGN PATENT DOCUMENTS

| JP | 2008502228 | A | | 1/2008 | |
| JP | 2008527806 | A | | 7/2008 | |
| JP | 2009111506 | A | | 5/2009 | |
| JP | 2017059944 | A | | 3/2017 | |
| JP | 2020087287 | A | | 6/2020 | |
| JP | 2020188425 | A | | 11/2020 | |
| WO | 2005120071 | A2 | | 12/2005 | |
| WO | 2006074161 | A2 | | 7/2006 | |
| WO | 2014127803 | A1 | | 8/2014 | |
| WO | WO2017/191362 | | * | 4/2017 | ............. G06B 23/02 |
| WO | WO2020/069049 | | * | 9/2019 | ............... G06N 3/02 |

OTHER PUBLICATIONS

Berggren, Response to Written Opinion of IPEA, Application No. PCT/FI2022/050086, 9 pages.

Fedorko et al; Proposal of the Methodology for Noise Sources Identification and Analysis of Continuous Transport Systems Using an Acoustic Camera, Faculty of Mechanical Engineering, Technical University of Kosice, Available Online Sep. 29, 2017, 17 pages.

Finnish Patent and Registration Office, International Preliminary Report on Patentability, International Application No. PCT/FI2022/050086, dated May 25, 2023, 52 pages.

Finnish Patent and Registration Office, International Search Report, Application No. PCT/FI2022/050086, dated May 16, 2022, 6 pages.

Finnish Patent and Registration Office, Office Action, Application No. 20215159, Nov. 15, 2021, 11 pages.

Finnish Patent and Registration Office, Written Opinion of International Preliminary Examination Authority, Application No. PCT/FI2022/050086, dated Apr. 19, 2023, 8 pages.

Finnish Patent and Registration Office, Written Opinion of International Searching Authority, International Application No. PCT/FI2022/050086, dated May 16, 2022, 10 pages.

Mattioli et al; 2D-3D Spatial Registration for Remote Inspection of Power Substations, Faculty of Electrical Engineering, Federal University of Uberlandia, Published Nov. 25, 2020, 24 pages.

Milgram et al; A Taxonomy of Mixed Reality Visual Displays, IEICE Transactions of Information Systems, vol. E77-D, No. 12, Dec. 1994, 15 pages.

Prihavec et al; User Interface for Video Observation Over the Internet, Computer Vision Laboratory, Faculty of Computer and Information Science, University of Ljubijana, 19 pages.

Sebe et al; 3D Video Surveillance with Augmented Virtual Environments, Integrated Media Systems Center, University of Southern California, 6 pages.

Japan Patent Office, Office Action, Application No. 2023549667, mailed Dec. 9, 2025, 2 pages, English Translation, 1 page.

\* cited by examiner

200

DATA PROCESSING UNIT

MEM

PROC

202

201a
201b
201c
201d 203
203a 204
204a 205
205a

ON     OFF     203a

205a

210

211

210

203a

212

205

211

212

205a

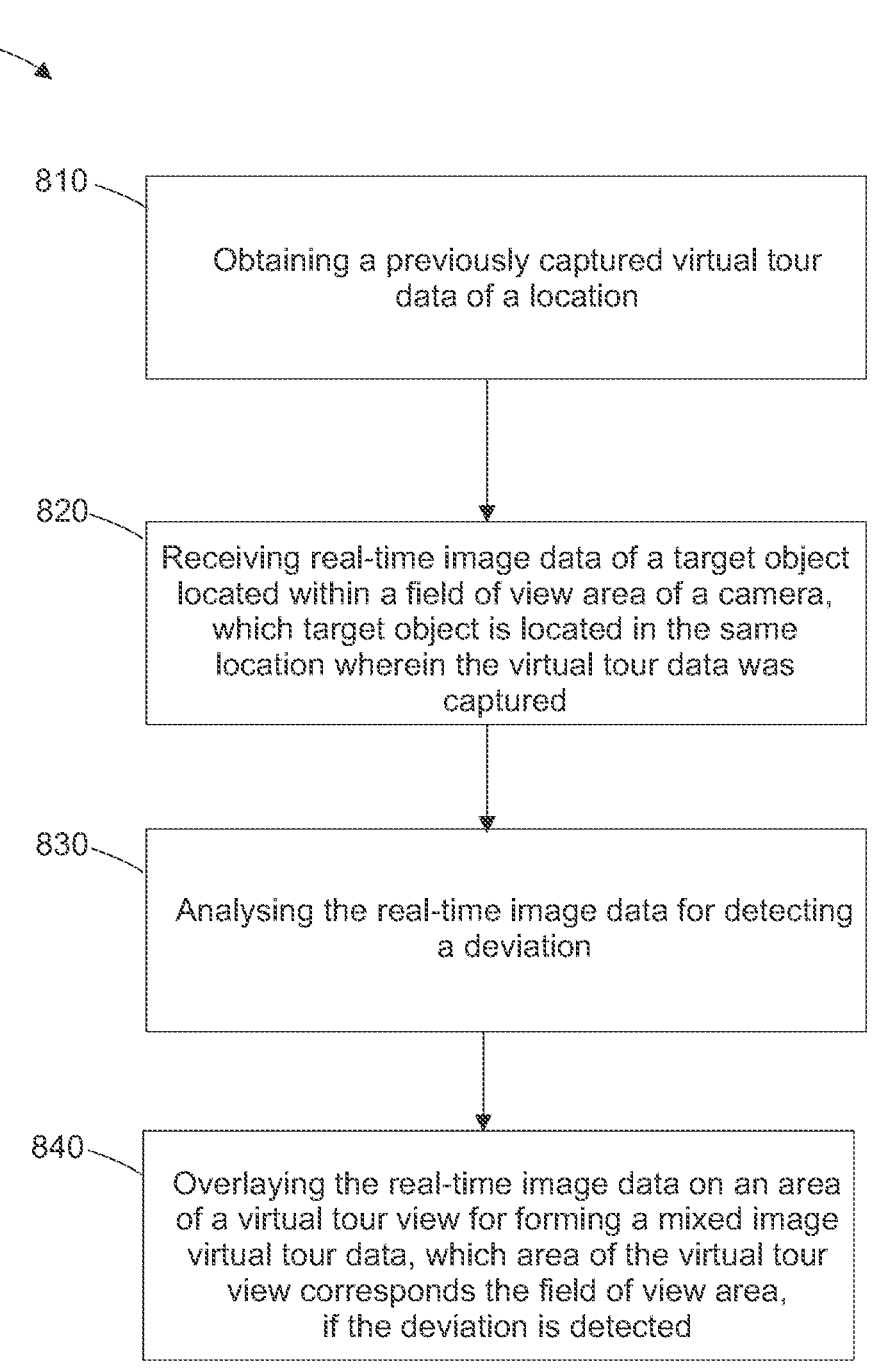

800

810 — Obtaining a previously captured virtual tour data of a location

820 — Receiving real-time image data of a target object located within a field of view area of a camera, which target object is located in the same location wherein the virtual tour data was captured 830 — Analysing the real-time image data for detecting a deviation 840 — Overlaying the real-time image data on an area of a virtual tour view for forming a mixed image virtual tour data, which area of the virtual tour view corresponds the field of view area, if the deviation is detected

FIG. 8

AUGMENTED VIRTUAL TOUR

FIELD

The aspects of the disclosed embodiments relate to a computer implemented method for augmenting a virtual tour.

The aspects of the disclosed embodiments also relate to a system and a computer program product causing an apparatus to carry out the method.

BACKGROUND

In many environments, for example, in industrial environments and production plants, there are situations when there is a need to monitor process or environment, in order to identify, for example, changes or a developing fault. It is a predictive maintenance. The use of monitoring allows maintenance to be scheduled, or other actions to be taken to prevent consequential damages and avoid its consequences. However, industry is not the only environment that benefits from monitoring, also monitoring the condition or state of the buildings increases the peace of mind of the owner.

For example, in industrial environments, there are a number of different kinds of elements, features, or factors that need to be monitored. For example, in pulp and paper manufacturing process in the paper industry, the process must be monitored in order to detect possible disorders. In many cases, it is not always sufficient to monitor the situation by watching measuring readings or by monitoring image data generated by cameras from different parts of the manufacturing site on screen(s) or rely on analysis results of image processing devices, but the information can be more efficiently obtained when a professional person visits the manufacturing site to check the process, for example, condition of the meters, machines and other essential manufacturing parts. However, this is not always possible, for example, due to a location of a manufacturing site or recommended due to challenging conditions in a manufacturing site.

Another example of locations desired to be monitored are homes and holiday apartments. People want to monitor their buildings remotely, for example due to the malfunctions of household appliances, or due to possible open water taps or doors. In many cases, it is either not adequate to monitor the situation watching measuring device readings received through internet or to relay door opening information, but the desired information is more efficiently obtained when a person enters the building and checks the situation by him/herself. However, this is not always possible, for example, due to a location of a holiday apartment, ongoing trips or work.

SEBE, I.O. et al. 3D video surveillance with Augmented Virtual Environments, XP058214676, discloses a visualization system for video surveillance based on an Augmented Virtual Environment (AVE) that fuses dynamic imagery with 3D models in a real-time display to help observers comprehend multiple streams of temporal data and imagery from arbitrary views of the scene.

PRIHAVEC, B. et al. User interface for video observation over the internet, XP007904173, discloses a system for live video transmission and remote camera control over the World Wide Web. The live video frame is superimposed on a 360° static panoramic picture. By interactively moving a rectangular frame in the panoramic picture, the user locally selects the new direction of the camera. Once the view is selected the users prompts the selection and the command is issued over the Internet to the remotely-controlled camera. The static panoramic image is constantly updated in areas where new live video information gets available.

SUMMARY

Now there has been invented an improved method and technical equipment implementing the method. Various aspects of the invention include a computer executable method, a camera system comprising at least one image sensor, and a computer readable medium comprising a computer program stored therein, which are characterized by what is stated in the independent claims. Various embodiments of the invention are disclosed in the dependent claims.

According to a first aspect, there is provided a computer implemented method, comprising obtaining a previously captured virtual tour data of a location, receiving real-time image data of a target object located within a field of view area of a camera, which target object is located in the same location wherein the virtual tour data was captured, analysing the real-time image data for detecting a deviation, and overlaying the real-time image data on an area of a virtual tour view for forming a mixed image virtual tour data, which area of the virtual tour view corresponds the field of view area, if the deviation is detected.

According to an embodiment, the virtual tour data is static image data of a real environment of the location. According to an embodiment, the previously captured virtual tour data comprises images along a walk through the location, and which previously captured virtual tour data is obtained from a camera, a memory or a cloud storage, and wherein the method further comprises: constructing the obtained virtual tour data as a virtual tour by a data processing unit. According to an embodiment, the previously captured virtual tour data is a ready-constructed virtual tour. According to an embodiment, the method further comprises receiving real-time acoustic data captured by an audio sensor in the location, analysing the received acoustic data for detecting a malfunction of the machine, and playing the acoustic data in an area of the mixed image virtual tour view corresponding the location of the audio sensor or its surroundings in the location if a malfunction is detected for further augmenting the mixed image virtual tour by real-time acoustic data. According to an embodiment, the method further comprises obtaining additional information about the location, analysing the additional information for detecting a deviation, and overlaying the additional information on the mixed image virtual tour view if a deviation is detected. According to an embodiment, the real-time image data is real-time video stream or frequently captured real-time images. According to an embodiment, the method further comprises capturing real-time image data to be overlayed on areas of the virtual tour view corresponding the field of view areas by more than one cameras. According to an embodiment, a time point of a view of the mixed image virtual tour is changeable to a previous time point.

According to a second aspect, there is provided a camera system comprising at least one camera and a data processing unit, wherein the data processing unit is configured to obtain a previously captured virtual tour data of a location and the at least one camera is configured to capture real-time image data of a target object located within a field of view area of the at least one camera, and which target object is located in the same location wherein the virtual tour data was captured, and wherein the data processing unit is further configured to analyse the real-time image data for detecting a deviation and overlay the real-time image data on an area of a virtual tour view for forming a mixed image virtual tour data, which area of the virtual tour view corresponds the field of view area, if the deviation is detected.

According to an embodiment, the system further comprises an audio sensor configured to capture acoustic data in the location and to transmit the captured acoustic data to the data processing unit analysis, and if a malfunction is detected, playing the real-time acoustic data in an area of the mixed image virtual tour view corresponding the location of the audio sensor or its surroundings in a real environment. According to an embodiment, the data processing unit is further configured to obtain additional information about the location, analyse the additional information and overlay the additional information on the mixed image virtual tour view if the data processing unit detects a deviation. According to an embodiment, the system comprises more than one cameras. According to an embodiment, a time point of a view of the mixed image virtual tour is changeable to a previous time point.

According to a third aspect, there is provided a computer program product, stored on a computer readable medium and executable in a computing device, wherein the computer program product comprises instructions to perform the method according to the first aspect and its embodiments.

DESCRIPTION OF THE DRAWINGS

In the following, the aspects of the disclosed embodiments will be described in more detail with reference to the appended drawings, in which FIG. 8 shows an embodiment, in which a block diagram of a computer implemented method for augmenting a virtual tour to a mixed image virtual tour, if a deviation is detected, is disclosed.

DETAILED DESCRIPTION

Figure 1A:
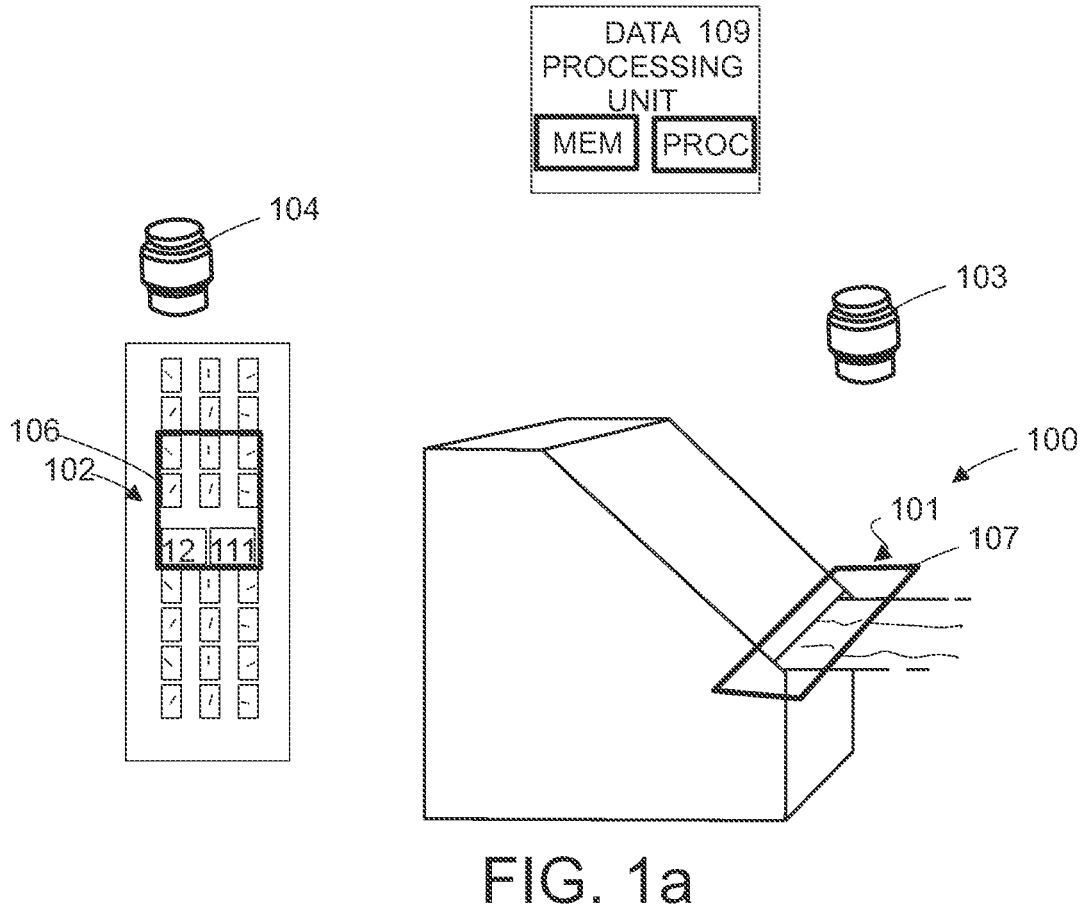
FIGS. 1*a-d* show an example embodiment, in which a mixed image virtual tour of a paper machinery environment is formed from a static virtual tour data of the paper machinery environment and at least one live video stream from the paper machinery environment.

A virtual tour is a simulation of an existing location, for example, machinery environment, usually composed of image data, for example, a sequence of videos or still images. It may also combine other multimedia elements such as sound effects, music, narration, and text in the image data. Herein the term "virtual tour" comprises static virtual tours or static 3D virtual tours created/constructed using images data from still cameras or video cameras. Static 3D virtual tours can be created using 3D reconstruction.

Static virtual tours may be made of a number of static images captured from a single imaging point, when the camera and lens are rotated around an imaging point, or from a number of static adjacent images captured as a tour progresses i.e. when an imager walks through the location, after which those adjacent images are combined to one virtual tour image. Virtual tour created using video cameras are linear walk-throughs in locations. The location may be imaged for a virtual tour, for example, at a walking pace while moving continuously through the location. The videos may be captured, for example, every few meters, for example, every 3 meters. These cameras usually stores video data with distance information. Distance measurements may be performed, for example, with a laser or lidar. This distance information may then be used to build a 3D model of the location. The benefit of using this walk-through method for capturing a virtual tour data compared to the virtual tour taken from a single imaging point is that the point of view changes constantly as a tour progresses and the person watching the virtual tour gets much more information of the location, especially when the location is large. However, capturing of a walk-trough virtual tour requires that a person or other moving solution walks or moves through a location. And in order to get a real-time information from virtual tours, there is a need that a person or other moving solution walks or moves through a location constantly. But the problem of real-time virtual tours is that it is not always possible to have a person to walk through a location due to its geographical location or due to, for example, hazardous process or machine environment, or some another moving solution, for example, an autonomous mobile robot moving through the location, due to height differences in floor plans or other obstacles in the location. In addition to that, even if an autonomous mobile robot moves through a location and images the surroundings of the location on its way, will the first captured image and its information be aged, e.g. measuring results, when the robot reaches the end of its tour. This means that measuring results at the beginning of the tour and at end of the tour are not measured at the same moment i.e. time point, which means that even if they have some kind of synergistic effect, it cannot be seen.

As explained above, virtual tours and virtual tour data used in the present disclosure are static and they comprise image data, for example, video images, which are usually captured at a certain time point or points in the past i.e. in history at a location. The idea of the present invention is to augment a static virtual tour by overlaying at least one or more live image streams of imaging point(s) i.e. spot(s) of the location onto one or more views of the virtual tour in order to provide an augmented virtual tour i.e. mixed image virtual tour. This kind of augmented virtual tour is more intuitive user experience and also provides up-to-date information with real-time image data for a person remotely monitors that location of the mixed image virtual tour. A camera captures this real-time (live) image data of a certain target object and camera's field of view is configured to replace the corresponding area in a view of the static virtual tour so that this area of view comprises real-time image when a user watches the mixed image virtual tour. Thus, the virtual tour image data provides a kind of frame structure for real-time image data and real-time image data is overlayed on the view(s) of the virtual tour. Real-time image data may be, for example, real-time video image data i.e. real-time video stream or frequently captured real-time still images. For example, a virtual tour has been imaged in a machine environment, for example, 1 month ago, certain area(s) of view(s) of the virtual tour will be replaced by real-time image data of the same area(s) by superimposing i.e. overlaying, for example, a real-time video stream on the view(s) of the static virtual tour so that an augmented mixed image virtual tour is formed. It is also possible to use frequently captured real-time still images instead of real-time video stream for augmenting the virtual tour. And as a more specific application example, an area of a measuring device display in a measuring device view in that 1 month ago captured virtual tour may be replaced by real-time image data of the same area of measuring device display. Thus, when a user moves along the augmented mixed image virtual tour of the machine environment, the measuring device will show the current, real-time, situation in corresponding places in the augmented mixed image virtual tour as in the real machine environment. Thus in the augmented mixed image virtual tour the user can perform a tour corresponding more a real measuring device monitoring tour in the machine environment, but now the monitoring tour is done virtually and measuring readings of the measuring device are still up to date. In this mixed image virtual tour can the readings of the measuring devices then be analysed visually. The number of real-time video streams overlayed in one view of a video tour may depend on number of cameras capturing image data of the area shown in the view.

The capturing of image data of a virtual tour may be performed by any suitable camera supported by a platform, for example, a wheeled platform structure, or a mobile robotic camera, an autonomous monitoring robot system, a camera supported and used by a person, or by any other suitable camera means. Term "camera" includes in this context any image sensor suitable for capturing images and/or video i.e. image data for a virtual tour, for example, a regular or smart camera, video camera, or any other suitable camera. The images/videos may be constructed by a data processing unit, for example, a server, or by any known computing means to a virtual tour form using any known methods of constructing virtual tours. The data processing unit may be a separate device receiving image data directly from a camera capturing the image data of the virtual tour, or it may receive images, for example, from a memory or cloud or another device. It is also possible that the virtual tour data is obtained, for example, from a memory, cloud storage or other device as a ready-made.

Real-time video image data or frequently captured real-time still images i.e. real-time image data configured to be added to the virtual tour may be captured by any suitable camera type described above, for example, a stationary surveillance camera may be aimed to desired target. The real-time image data may be transmitted to the data processing unit and the data processing unit may overlay the real-time image data on a virtual tour view i.e. it combines real-time image data with the virtual tour data in order to provide a mixed image virtual tour. After this, the mixed image virtual tour may be shown/displayed or it may be transmitted for a user to be viewed/displayed, which user even a distance from the machine environment, can monitor the machine environment by moving in the mixed image data virtual tour.

Unlike augmented realty (AR), which shows real-time environment and overlays part(s) of it by digital information and, for example, by previously captured images, the augmented mixed image virtual tour of the present invention shows previously captured virtual tour of a location or an environment, e.g. 360 degrees virtual tour, and superimposes i.e. overlays area(s) of it by real-time images or videos of corresponding area(s), for example, of measuring results of mechanical components, valves, belts or other equipment or other process measurements so that real-time image data is shown on top of view(s) of the static virtual tour and in places corresponding the places where they would be seen in the real-world location and environment.

FIGS. 1a-1d show an example embodiment, in which a mixed image virtual tour of a paper machinery environment 100 is formed from image data of a static virtual tour of the paper machinery environment 100 and at least one real-time video stream of target objects 101, 102 from the paper machinery environment 100. FIG. 1a shows two cameras 103, 104 each comprising an image sensor. The cameras 103, 104 are configured to image i.e. capture real-time image data, which in this example is a real-time video stream. The first camera 103 is arranged to capture a real-time video stream from a first target object, which in this embodiment is a wet end 101 of a paper machine. The second camera 104 is arranged to image a real-time video stream from a second target object, which in this embodiment is an area of a device 102 displaying measuring results of 8 measuring devices measuring different data of the machine environment or the paper machine itself. The first and second field of view areas 107, 106 of the cameras 103, 104 are shown by rectangles. The first and second field of view areas 107, 106 comprise the first and second target objects 101, 102, correspondingly.

The cameras 103, 104 comprise data transferring means, for example, a transmitter or a transceiver, for transmitting real-time video image data wirelessly or via wired connection from the cameras 103, 104 to a data processing unit 109. The data processing unit 109 comprises at least one processor, at least one memory including computer program code for one or more program units and means for receiving real-time video image data wirelessly or via wired connection from the cameras 103, 104, for example, a receiver or a transceiver. There may be multiple processors e.g. a general purpose processor, a graphics processor and/or a DSP processor and/or multiple different memories e.g. volatile memory for storing data and programs at run-time and non-volatile memory such as a hard disk for permanently storing data and programs. The data processing unit 109 may be any computing device suitable for handling and processing image data such as a computer. The data processing unit 109 may be in electronic communication with the cameras 103, 104 via signal lines. The data processing unit 109 may also include a video controller and an audio controller for generating signals that can be produced for the user with computer accessories. The data processing unit 109 may produce output to the user through output means. The video controller may be connected to a display (not shown). The display may be e.g. a flat panel display, a tablet, a display of a laptop or a projector for producing a larger image. The audio controller may be connected to a sound source, such as loudspeakers or earphones. The cameras 103, 104 may also include an acoustic sensor such as a microphone.

The data processing unit 109 is configured to receive real-time video image data from the cameras 103, 104 and to overlay at least one position/area of a view of the static virtual tour comprising corresponding areas as the one that camera 103, 104 imaged by the above-mentioned real-time video image data on. The data processing unit 109 may have received image data of this static virtual tour from a camera that imaged it and the data processing unit 109 may have constructed the virtual tour from this image data, or the data processing unit 109 may have received the virtual tour as ready-constructed, for example, from another computing device, from a memory or cloud storage.

It is also possible that instead of two cameras 103, 104 as in this example embodiment, there is only one camera arranged to image a real-time video stream or that there are more than two cameras arranged to image a real-time video streams, for example, 3-10, or even more, from different parts of the paper machinery environment.

Figure 1B:
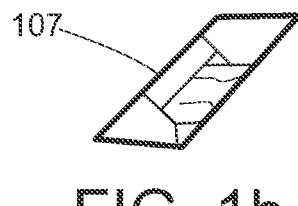

FIG. 1b shows as an example the first field of view area 107 configured to be overlayed i.e. superimposed on the corresponding area of a previously imaged static virtual tour of the paper machinery environment 100. Pulp fed onto a wire is shown in the first field of view area 107. The real-time video image data of the second field of view area 106 may also be superimposed onto an area of a view of the virtual tour corresponding the area of the second field of view area 106, even if not shown in this example.

Figure 1C:
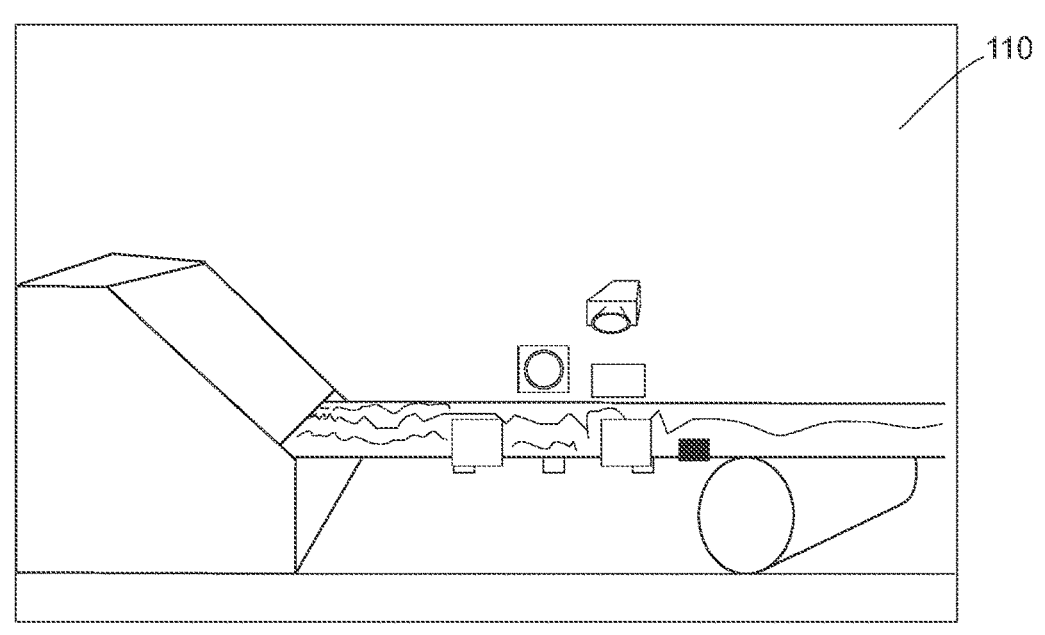

FIG. 1c shows a wet end view 110 of the virtual tour of the paper machinery environment 100. This view 110 comprises the same target object 101 as the first field of view area 107 i.e. the wet end 101 of the paper machine.

Figure 1D:
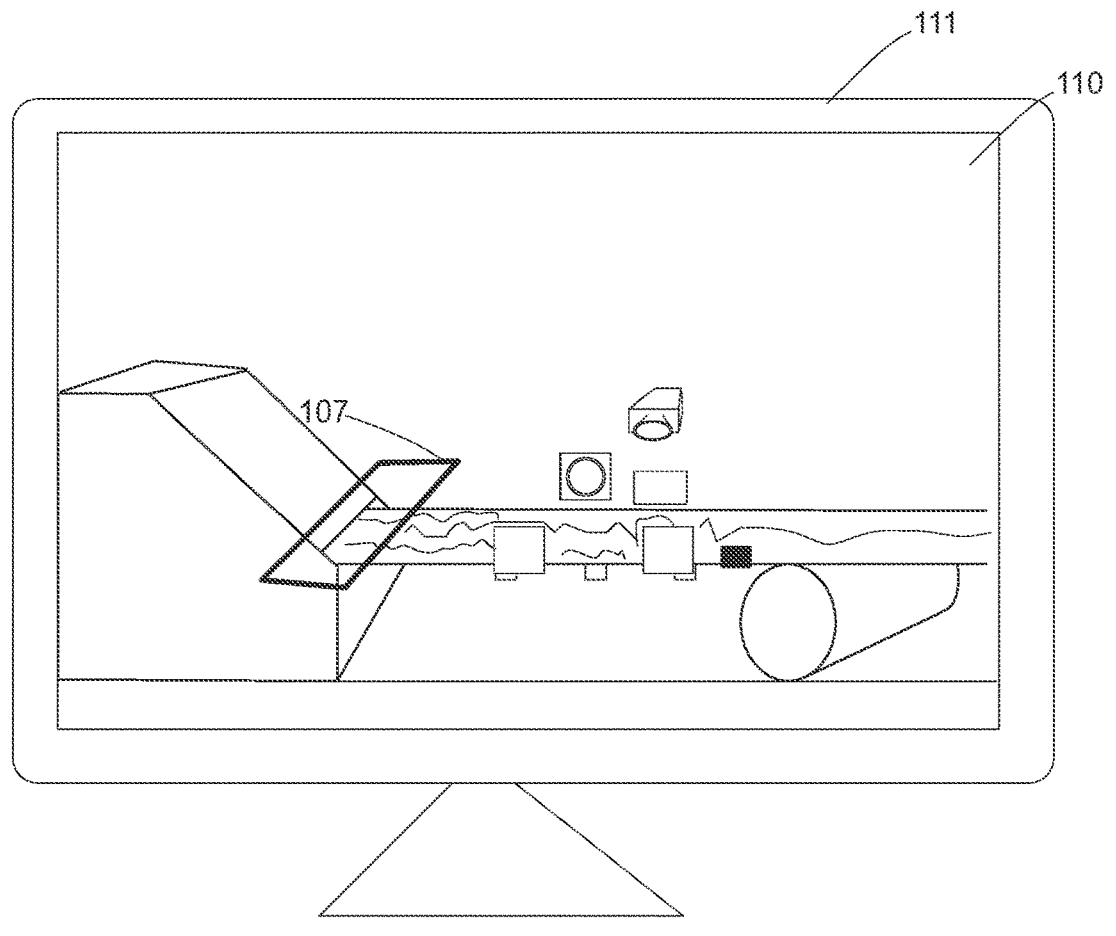

FIG. 1d shows a plan view of a user terminal 111 presenting the view 110 of the static virtual tour as a view of the mixed image virtual tour of the paper machinery environment 100. In this embodiment, the user terminal 111 is a monitor. In this view 110 of the mixed image virtual tour the first field of view area 107 is superimposed onto the corresponding area of the view 110 of the static virtual tour so that the view of the mixed image virtual tour is formed. As can be seen, the rest of the view 110 is old and static, but the area of the wet end 101 comprises real-time image data, which is updating in real-time. The form of the pulp on the wire is now different than it was when the virtual tour was captured.

Figure 2A:
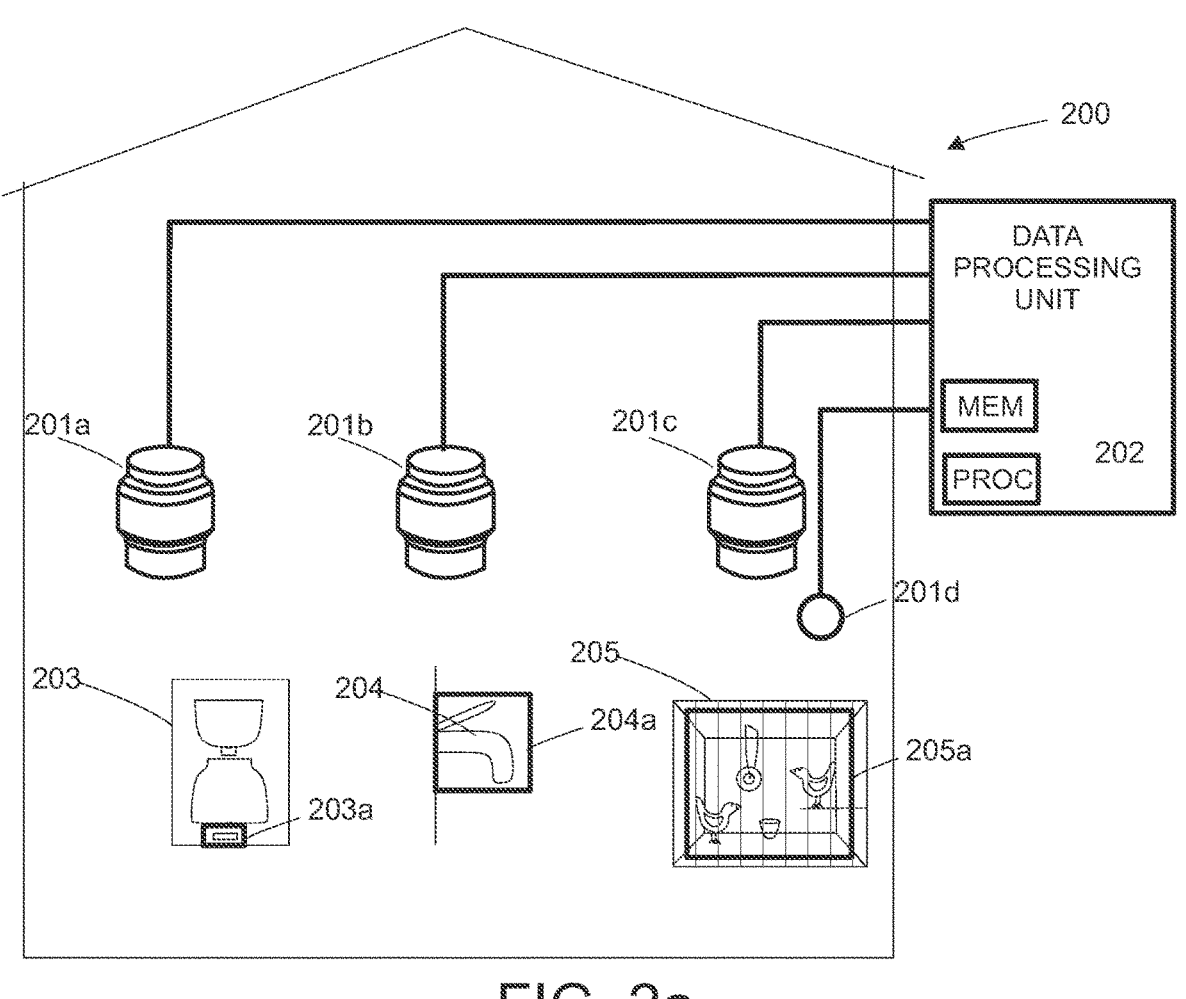
FIGS. 2*a-f* show a forming principle of a mixed image virtual tour of a house according to an embodiment of the invention.

FIGS. 2a-2f show a forming principle of a mixed image virtual tour of a house 200 according to an example embodiment. The mixed image virtual tour of the house 200 is formed from a previously captured static virtual tour of the house 200 and two real-time video streams. FIG. 2a shows three cameras 201a, 201b, 201c, each comprising an image sensor. The cameras 201a, 201b, 201c are configured to image real-time image data, which in this example is real-time video stream. The first camera 201a is arranged to image a real-time video stream from a first target object, which in this embodiment is a switch of a coffee maker 203. The second camera 201b is arranged to image a real-time video stream from a second target object, which in this embodiment is a bathroom tap 204. And the third camera 201c is arranged to image a real-time video stream from a third target object, which in this embodiment is a bird cage 205. Field of view areas 203a, 204a, 205a of the first, second and third cameras 201a, 201b, 201c are shown by rectangles, correspondingly. Each field of view area 203a, 204a, 205a comprises target objects 203, 204, 205, correspondingly. In this embodiment, there is also a microphone 201d. The microphone 201d is arranged in the proximity of the bird cage 203 so that it is capable to capture audio signal i.e. acoustic data produced by the birds in the cage 203.

The cameras 201a, 201b, 201c comprise data transferring means, for example, a transmitter or a transceiver, for transmitting real-time video image data wirelessly or via wired connection from the cameras 201a, 201b, 201c to a data processing unit 202. The data processing unit 202 may be, for example, a server. The data processing unit 202 comprises at least one processor, at least one memory including computer program code for one or more program units and means for receiving real-time video image data wirelessly or via wired connection from the cameras 201a, 201b, 201c and acoustic data from the microphone 201d, for example, a receiver or a transceiver. There may be multiple processors e.g. a general purpose processor, a graphics processor and/or a DSP processor and/or multiple different memories e.g. volatile memory for storing data and programs at run-time and non-volatile memory such as a hard disk for permanently storing data and programs. The data processing unit 202 may be any computing device suitable for handling/processing image and audio data such as a computer. The data processing unit 202 may be in electronic communication with the cameras 201a, 201b, 201c and the microphone 201d via signal lines. The data processing unit 202 may also include a video controller and an audio controller for generating signals that can be produced for the user with computer accessories. The data processing unit 202 may produce output to the user through its output means. The video controller may be connected to a display (not shown). The display may be e.g. a flat panel display, a display of a laptop or a projector for producing a larger image. The audio controller may be connected to a sound source, such as loudspeakers or earphones. Physically the data processing unit 202 may locate in the house 200 or outside the house 200. It is also possible that the cameras 201a, 201b, 201c and the microphone 201d transfer their data to a cloud storage, wherefrom the data processing unit 202 may retrieve the data.

The data processing unit 202 is configured to receive real-time video image data from the cameras 201a, 201b, 201c and audio signal from the microphone 201d or from the cloud storage, and to add the above-mentioned real-time video image data to a suitable view of the static virtual tour comprising corresponding areas as cameras 201a, 201b, 201c imaged and to add audio signal to a suitable position of a view of the static virtual tour corresponding position as where the microphone 201d is located or to position of the view of the static virtual tour where the audio signals captured by the microphone 201d would be heard in real-world situation.

Again the number of cameras and/or microphones capturing real-time data can be different. Also the number of cameras and/or microphones, which data is added to the mixed image virtual tour can vary as needed or desired. The cameras 201a, 201b, 201c may also include an acoustic sensor such as a microphone.

Figure 2B:

FIG. 2b shows as an example the first field of view area 203a of the coffee maker switch configured to be superimposed on corresponding area of a kitchen view 210 of a previously imaged static virtual tour of the house 200. It can be seen from the first field of view area 203a that the switch is now OFF. The second field of view area 203b of the bathroom tap 204 is not shown in this FIG. 2b, but it is possible that it is also configured to be superimposed on corresponding area of a bathroom view of the virtual tour of the house 200. FIG. 2b also shows the third field of view area 205a of the bird cage 205 configured to be superimposed on corresponding area of a living room view of the static virtual tour of the house 200. It can be seen from the third field of view area 205a the current situation of the birds in the cage 205.

Figure 2C:
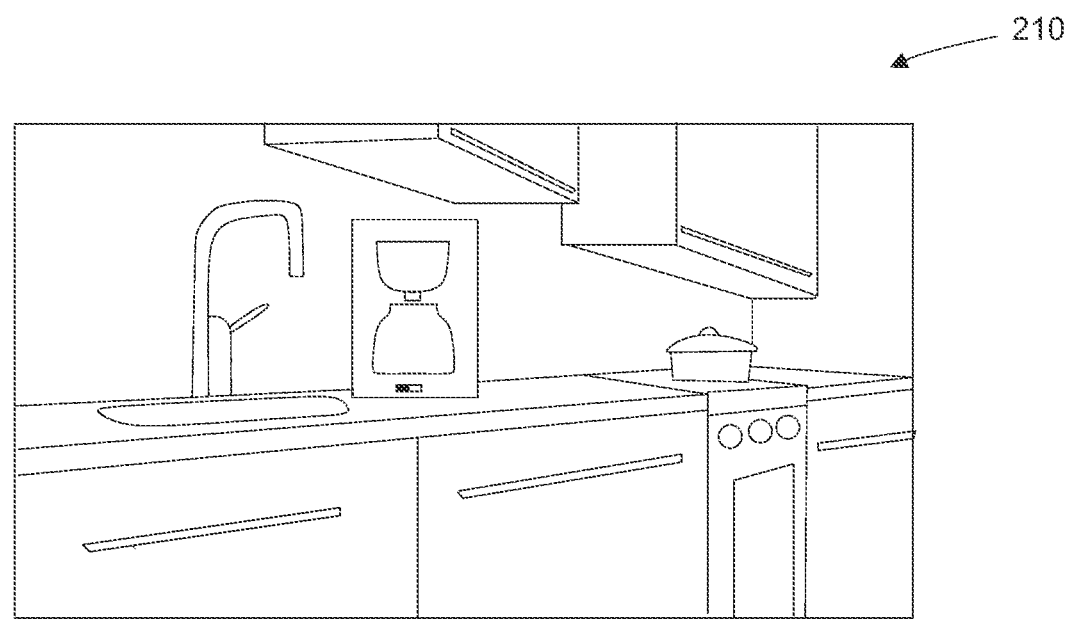

FIG. 2c shows the kitchen view 210 of the virtual tour of the house 200. This view 210 shows the first target object i.e. coffee maker switch configured to be replaced by the first field of view area 203a, the switch is ON.

Figure 2D:
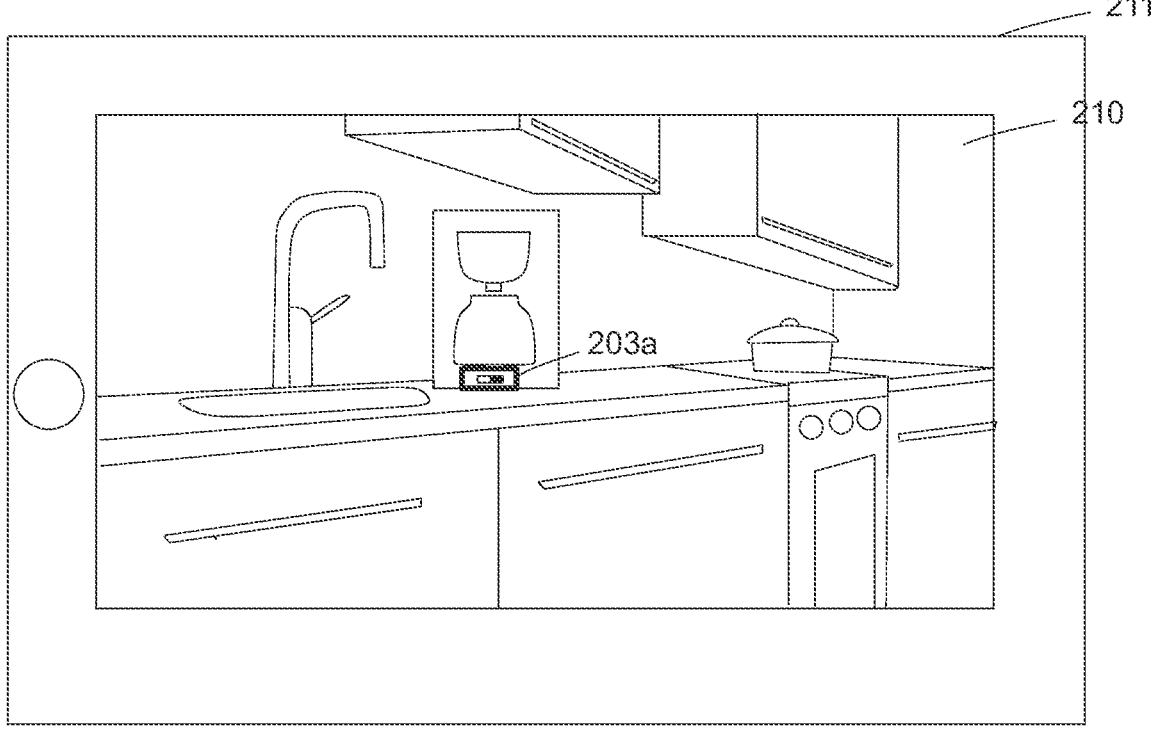

FIG. 2d shows the kitchen view 210 on a user terminal 211 that is a hand hold device, for example, a tablet presenting the kitchen view 210 of the mixed image virtual tour. In this view 210 the first field of view area 203a i.e. the coffee maker switch area is superimposed i.e. overlayed on to the corresponding area of the kitchen view 210. As can be seen, the rest of the view 210 is old and static, but the coffeemaker switch area comprises live data and it is updated in real-time and it can be seen that it is in different state than it was, when the kitchen view 210 of the virtual tour was captured.

Figure 2E:
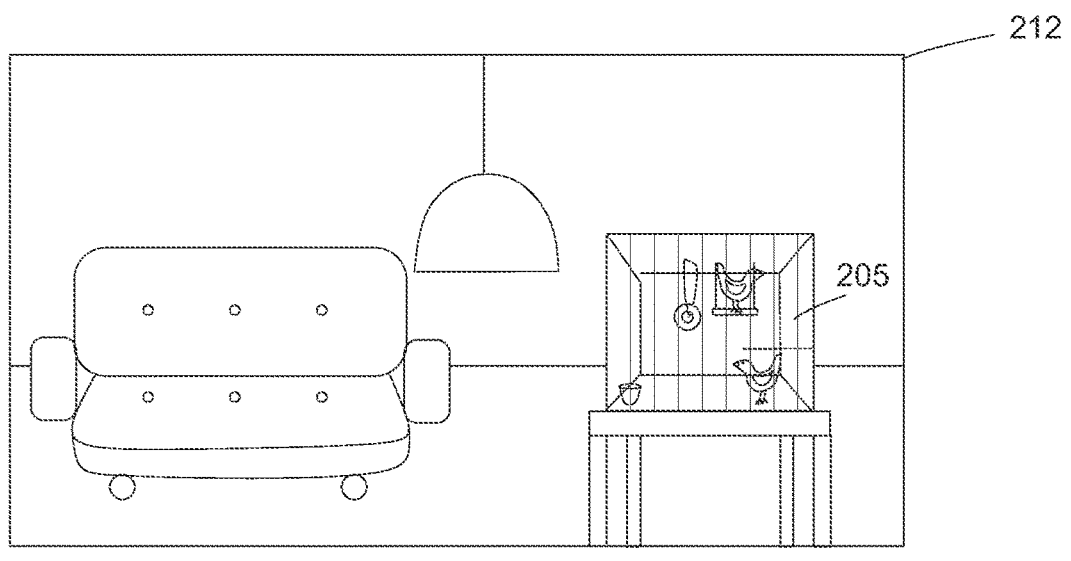

FIG. 2*e* shows the living room view 212 of the virtual tour of the house 200. This view 212 shows the third target object i.e. the bird cage 205 configured to be replaced by the third field of view area 205*a* in the mixed image virtual tour.

Figure 2F:
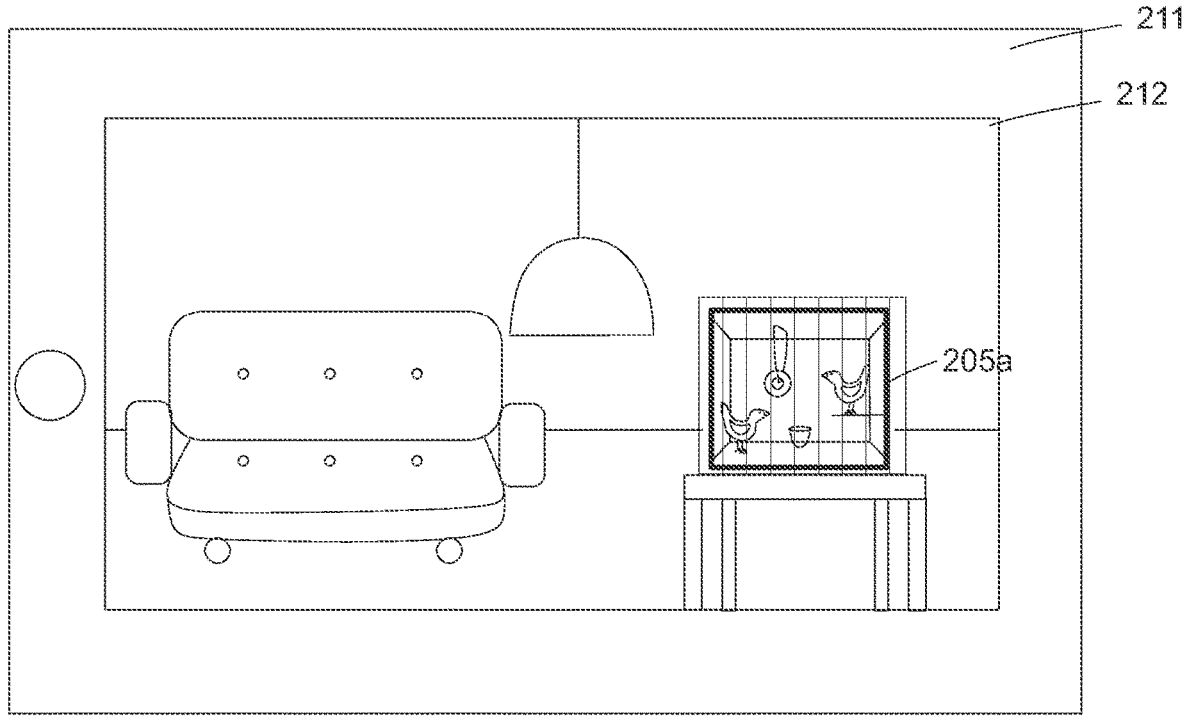

FIG. 2*f* shows the living room view 212 on the user terminal 211. In this view 212 the third field of view area 205*a* i.e. the bird cage area is superimposed on to the corresponding area of the living room view 210 of the virtual tour. As can be seen, the birds are positioned differently in this augmented view as they were when the living room view 210 of the virtual tour was imaged.

The audio signal captured by the microphone 201*d* may also be configured to be played when the user enters the living room in the mixed image virtual tour. It is also possible that the audio signal captured by the microphone 201*d* is configured to be played when the user exceeds a certain predetermined distance from the bird cage when entering the living room in the mixed image virtual tour and stopped when the user exceeds a second certain predetermined distance from the bird cage when leaving the living room in the mixed image virtual tour.

The replaced area(s) in a view or views of a mixed image virtual tour i.e. areas(s), wherein real-time image data is superimposed on view(s) of a static virtual tour may be indicated so that the user can more easily detect, which part(s) of the mixed image virtual tour are real-time data and which not. The indication may be done, for example, by framing the replaced area with color or lighting, which could flash or not, or using brighter lighting in the replaced area or by slightly blurring surroundings of the real-time area.

FIGS. 3*a*-3*d* show an example embodiment, in which these two different views of a mixed image virtual tour of a paper machinery environment, wherein overlayed image data i.e. video streams is captured in two different time points. In these FIGS. 3*a*-*d*, views 110, 310 of a previously captured static virtual tour of the paper machinery environment and video streams overlaying on certain areas of these views are disclosed.

Figures 3A, 3B, 3C, 3D:
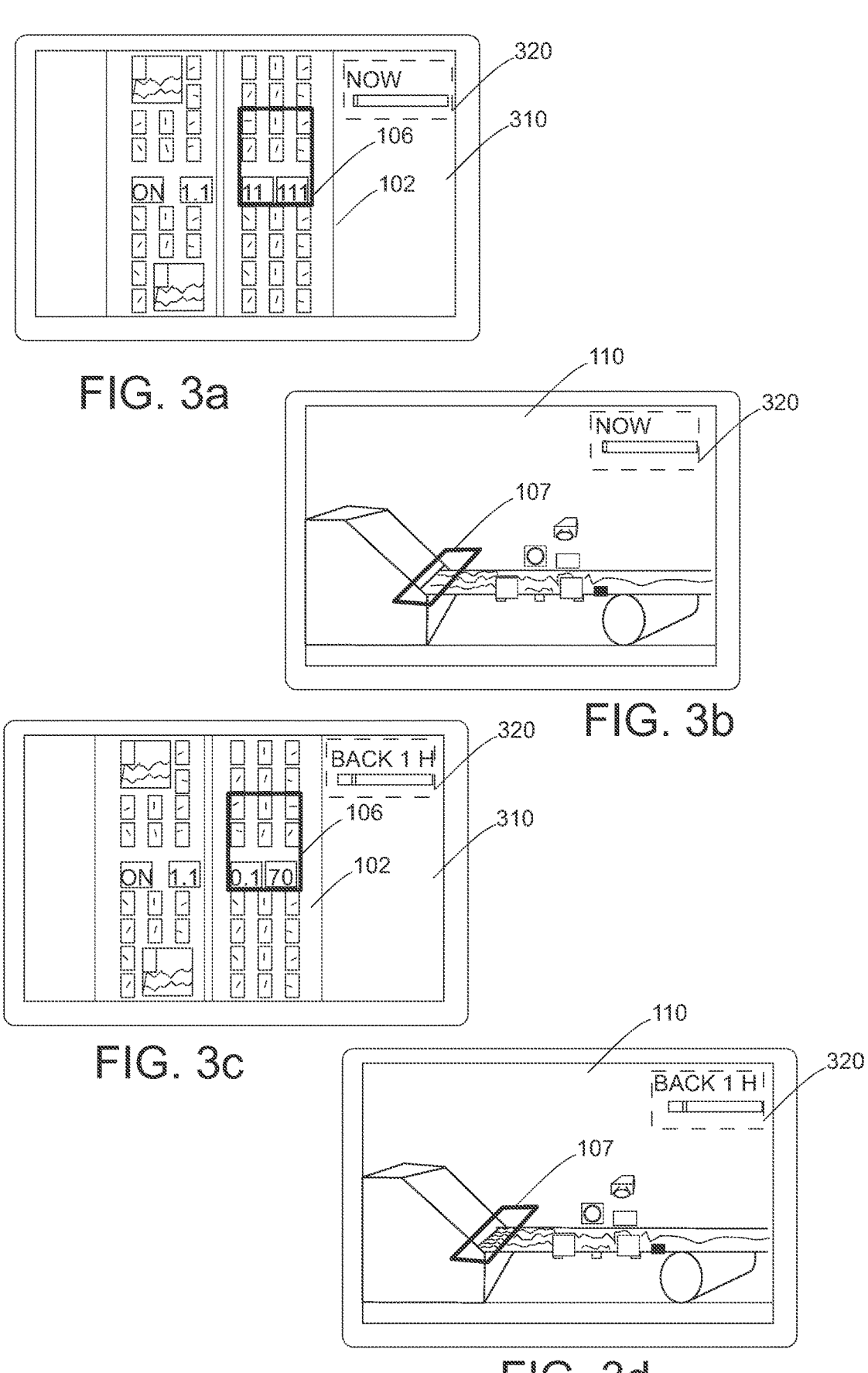
FIGS. 3*a*-3*d* show an example embodiment, in which two different views of a mixed image virtual tour of a paper machinery environment are shown in two different time points.

FIG. 3*a* shows a monitoring room view of the mixed image virtual tour, wherein two devices displaying measuring results are shown. A real-time video stream from a target object, which in this image is the same area of a device 102 displaying measuring results as in the FIG. 1*a*, is captured by a video camera. And the field of view area 106 of the camera is again overlayed on the view 310 of the previously captured static virtual tour and to the corresponding place where this area of the device 102 displaying measuring results is in the real paper machinery environment and in monitoring room view 310 of the previously captured static virtual tour. The time point of this view of the mixed image virtual tour is indicated by a time indicator 320 on top of the view, but it is also possible to display this time indicator 320 by some other way. As can be seen, the time point, when shown and overlayed image data is captured, corresponds the present moment, now, and the data superimposed onto the view 310 of the previously captured static virtual tour is real-time image data.

FIG. 3*b* shows the wet end view of the mixed image virtual tour, wherein pulp fed to the wire is shown. A real-time video stream from a target object, which in this image is the same wet end area as in the FIG. 1*a*, is captured by a second video camera. And field of view area 107 of the camera is again overlayed on the view 310 of the previously captured static virtual tour and to the corresponding place where this area of the wet end is in the real paper machinery environment and in wet end view 310 of the previously captured static virtual tour. The time point when the image data of this view of the mixed image virtual tour was captured by the second video camera is again indicated by the time indicator 320 on top of the view. As can be seen, the time point again corresponds the present moment, now, and the data superimposed onto the view 310 of the previously captured static virtual tour is real-time image data.

But according to example embodiment, it is possible to change a time point of the mixed image virtual tour backwards, i.e. to change the time point of overlayed image data displayed in the views of the mixed image virtual tour to a time point earlier than the present time point. The earlier time point may then be the same in all views of the mixed image data virtual tour. These earlier time point views of the mixed image virtual tour will then show the views of the previously captured static virtual tour and image data captured at that same earlier time point. This type of presentation would not be possible in a case of an ordinary virtual tour, because the imaging device that captured or will capture the image data for the virtual tour cannot capture the data so that image capturing time is exactly the same in all views. And this capability of showing simultaneously captured information in all views of the mixed image virtual tour, as has already been said above, may be necessary in determining the cause-and-effect relationships of damages and avoiding consequences of the damages.

FIGS. 3*c* and 3*d* show the same monitoring room and wet end views of the mixed image virtual tour as FIGS. 3*a* and 3*b*, respectively, but at an earlier time point, an hour ago. Thus, the FIG. 3*c* shows the monitoring room view, wherein two devices displaying measuring results are shown. The field of view area 106 of the camera is again superimposed onto the view 310 of the previously captured static virtual tour. The time point of capturing overlayed image data of this monitoring room view of the mixed image virtual tour is indicated by the time indicator 320. The image data overlayed on the view 310 of the previously captured static virtual tour corresponds video image data captured at that indicated time point of the area of the device 102 displaying measuring results of 8 measuring devices measuring different data of the machine environment or the paper machine itself. And the FIG. 3*d* shows the wet end view. The field of view area 107 of the camera is again overlayed on the view 310 of the previously captured static virtual tour. The time point of this wet end view of the mixed image virtual tour is again indicated by the time indicator 320. The image data overlayed on the view 310 of the previously captured static virtual tour corresponds video image data captured at that indicated time point of the wet end of a paper machine and indicated by the time indicator 320.

As can be seen, there are differences in the measurement results in the field of view area 106 of the monitoring room view and in the pulp in the field of view areas 107 of the wet end view between the different time points, whereas the rest of the views of the mixed image virtual tour have remained the same.

Change of the time points of the views to be displayed can be determined, for example, by moving a square part on the horizontal axis of the time indicator 320 or by any other way. It should be noted that it is predetermined that at the selected time point all data shown overlaying on the views of the mixed image virtual tour have been captured at that same selected time point. In other words, if the user selects to see a mixed image virtual tour captured 10 minutes ago, images overlaying on all of the views are captured 10 minutes ago, whereas in the real-time view all data including images or image streams overlaying on all of the views are real-time image data. However, it is also possible, that time point can be selected so that at least one view shows image data captured at a different time point compared to image data overlaying on other views of the mixed image virtual tour. Also the played acoustic signal data is captured at the time point selected.

Figure 4:
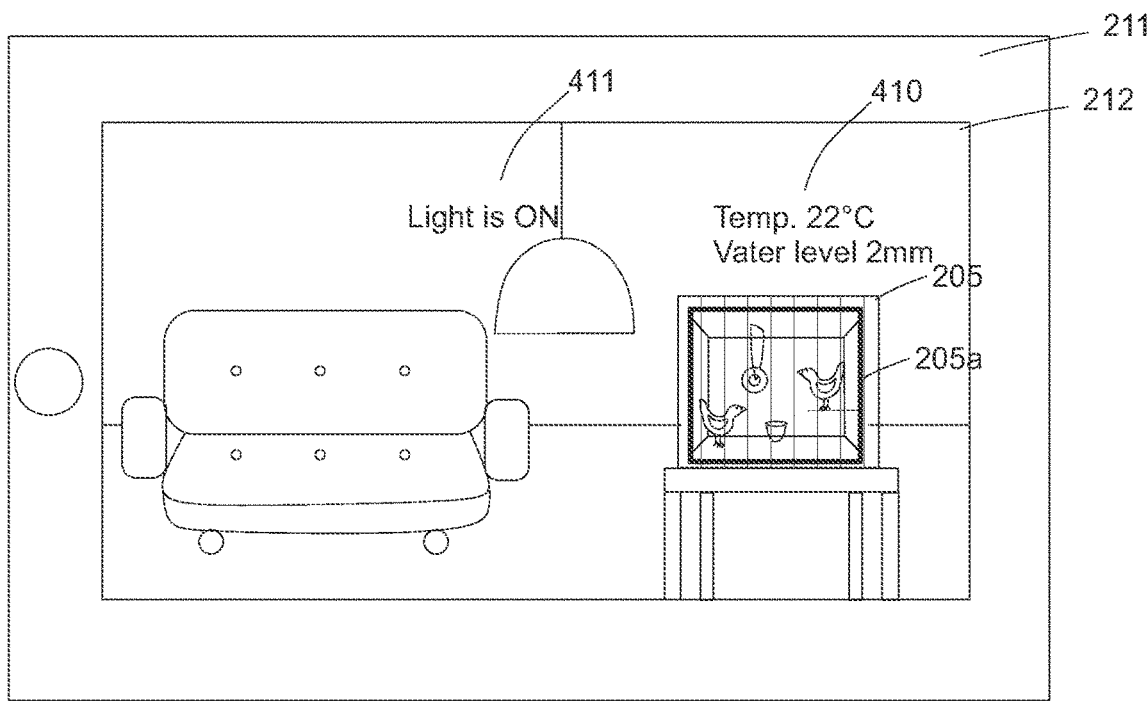
FIG. 4 shows an example embodiment, in which an additional information is overlayed on a mixed image virtual tour view of a house environment.

FIG. 4 shows the same living room view 212 on the user terminal 211 as the FIG. 2f. In this view 212, the field of view area of the bird cage 205a of real-time video image data is overlayed on the corresponding area of the living room view 210 of the previously captured virtual tour so that an augmented virtual tour i.e. mixed image virtual tour is formed by a data processing unit. However, in this FIG. 4, in addition to real-time image data, also additional information is overlayed on the living room view 210. The additional information, which may be shown in views of the mixed image virtual tour may be, for example, any information relating to the environment of the view or other parts of the virtual tour. In this figure, a first additional information 410 relates to the bird cage shown in the field of view area of the bird cage 205a. The first additional information 410 indicates a temperature around the bird cage 205 and also water level of a water bowl inside the bird cage 205. The second additional information 411 relates to a lighting device i.e. a ceiling hanging lamp and it indicates that the lamp is on.

Additional information shown in FIG. 4 are just examples. The additional information may also relate, for example, to sensor readings or measuring results shown in a field of view area or other information relating, for example, to those measuring results. Sensor readings or measuring results may be captured by sensors within the location, for example, sensors of the machines and/or sensors of other connected devices. In some cases, additional information is indicative of sensor data captured that pertain to structures, devices, or other objects in the location. The additional information may be shown, for example, next to the field of view area, under it or on top of it, or in any other place on top of the view of the mixed image virtual tour. The additional information may also be captured simultaneously with image data overlaying on a view or it may be history data, but it is also possible that additional information data is gathered around the time point in which time point image data overlaying on a view of a mixed image virtual tour is captured, for example, 1 min before and other. Alternatively, any other time period instead of 1 min may be used. The time period may depend on, for example, the additional information or a user may configure the time period. It is also possible that a data processing unit analyses the additional information by comparing it to reference values and if it detects a deviation i.e. for example, that value of the additional information is under or over a predetermined reference value, the additional information is overlayed on a view, otherwise not.

A data processing unit may obtain additional information about the location or environment, for example, from above mentioned sensors or measuring devices and overlay the additional information on a mixed image virtual tour data.

Figure 5:
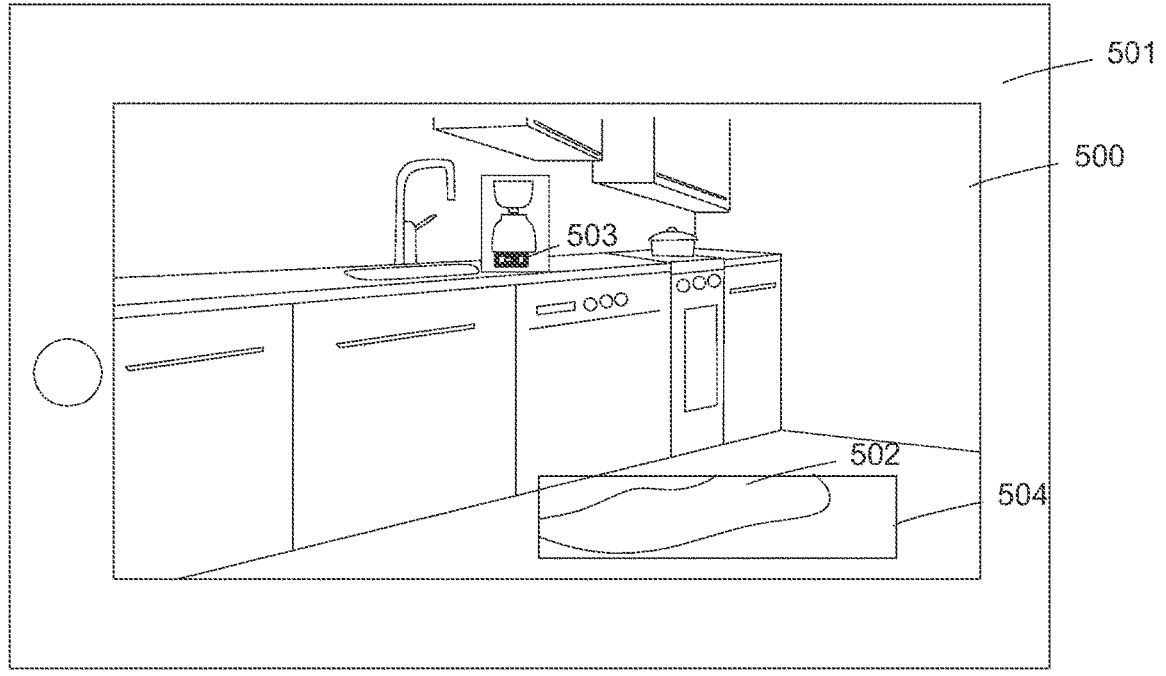
FIG. 5 shows an example embodiment, in which a view of a mixed image virtual tour is shown.

FIG. 5 shows a kitchen view 501 of a mixed image virtual tour on a user terminal 500. In this view 501 real-time video data of a field of view area 503 of a first real-time video camera is overlayed on the kitchen view 501. The field of view area 503 corresponds substantially the coffee maker switch area. In this FIG. 5, it is also shown another field of view area of a second video camera corresponding an area in front of a dishwasher 504. The second video camera is arranged to capture image data from the target object i.e. the area in front of the dishwasher 504 and to transmit image data to the data processing unit. The real-time video data of the field of view area 504 of the second video camera is shown on the kitchen view 501 of the mixed image virtual tour, only when the data processing unit of a camera or an external data processing unit when analysing captured image data of the second video camera detects a predetermined deviation on the floor. In this example, the deviation 502 is water on the floor i.e. a water leak from the dishwasher. In other words, image data of this field of view area 504 is overlayed on the kitchen view 501 of the mixed image virtual tour after a deviation 502 is detected in the captured image data of the second camera. This kind of image data displayed when a deviation is detected in the image data may be called as a pop-up image data.

Overlaying real-time video stream of the second video camera on the area in front of the dishwasher in the kitchen view 501 of the mixed image virtual tour may be performed by the data processing unit constructing the mixed image virtual tour as well as it may overlay on real-time video stream of the first video camera the switch area of the coffee maker of the kitchen view 501 of the mixed image virtual tour, but this real-time video stream of the switch is constantly overlayed on the kitchen view. The data processing unit constructing the mixed image virtual tour may be the data processing unit analysing the image data or another data processing unit, which may be, for example, the same that obtained ready-constructed virtual tour data or constructs the virtual tour. The pop-up real-time video stream of the second video camera may be shown in the kitchen view 501 until a user indicates to the data processing unit that the deviation has been seen, until the data processing unit analyzing the image data of the second video camera detects that the deviation is not detectable anymore or a predetermined time period.

The pop-up real-time video stream of the second video camera will again be shown on the kitchen view 504 of the mixed image virtual tour if, when analyzing the image data of the second video camera, a new deviation is detected. The data processing unit may further be arranged to notify a user, even before the user watches the mixed image virtual tour, that image data relating to a predetermined deviation is now shown in a view of the mixed image virtual tour.

The data processing unit comprises at least one processor, at least one memory including computer program code for one or more program units and means for receiving image data wirelessly or via wired connection from at least the second video camera, for example, a receiver or a transceiver. There may be multiple processors e.g. a general purpose processor and a graphics processor and a DSP processor and/or multiple different memories e.g. volatile memory for storing data and programs at run-time and non-volatile memory such as a hard disk for permanently storing data and programs. The data processing unit may be any computing device suitable for handling image data such as a computer. The data processing unit is in electronic communication with at least the second video camera via signal lines, respectively. The second video camera may also include a video controller and an audio controller for generating signals that can be produced for the user with computer accessories. The second video camera may produce output to the user through output means. The video controller may be connected to a display. The display may be e.g. a flat panel display or a projector for producing a larger image. The audio controller may be connected to a sound source, such as loudspeakers or earphones. The second video camera may also include an acoustic sensor such as a microphone.

The rest of the kitchen view 501 is old and static, but the coffeemaker switch area 503 and the area in front of the dishwasher 504, when a deviation is detected, comprise live data received from the cameras.

It is also possible that the user selects a time point, other than real-time, in which time point image data overlaying on the kitchen view of the mixed image virtual tour is captured. This way, the user may see how or in what time the deviation has evolved or when the image of the deviation appeared to the kitchen view 501 of the mixed image virtual tour.

Figure 6:
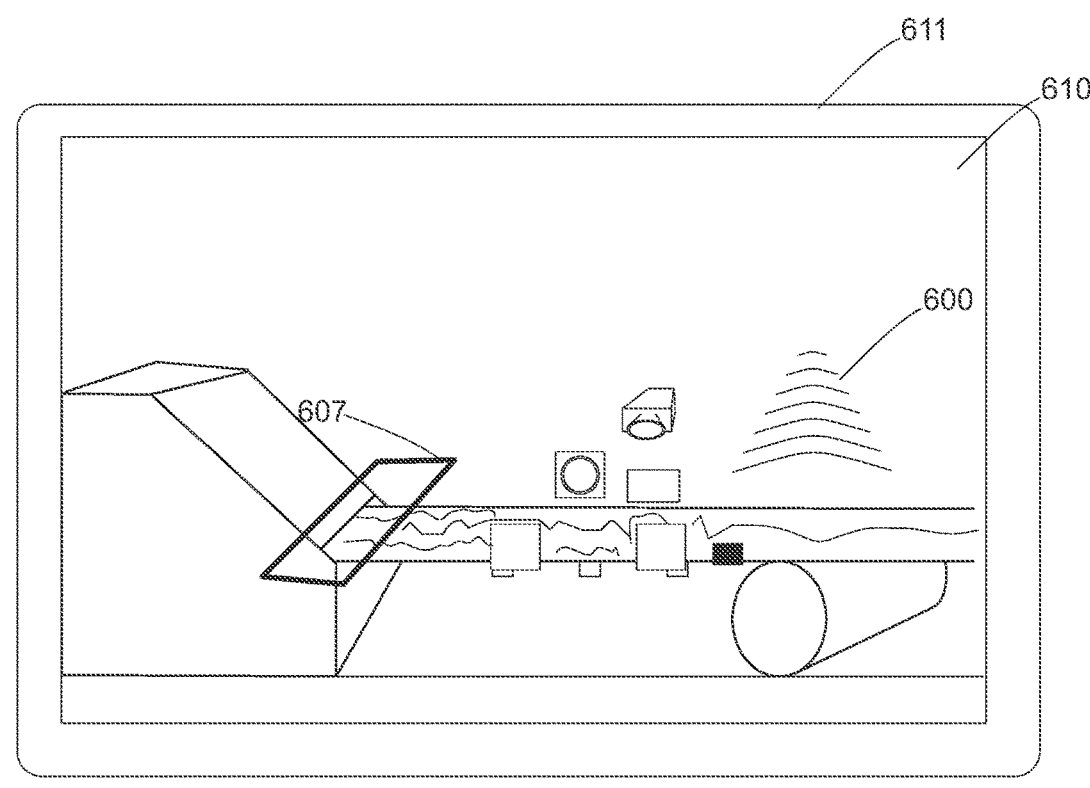
FIG. 6 shows an example embodiment, in which a view of a mixed image virtual tour is shown.

FIG. 6 shows an example of a plan view of a user terminal 611 presenting a wet end view 610 of a mixed image virtual tour of a paper machinery environment. The wet end area of a paper machine is a target object in this example. In the paper machinery environment, there is a real-time video camera capturing real-time video stream of the wet end area. In this wet end view 610 of the mixed image virtual tour real-time video stream data of a field of view area 607 of the real-time video camera is superimposed onto the corresponding wet end area of the wet end view 610 of a static virtual tour so that the mixed image virtual tour is formed. But in this example, there is also an acoustic sensor such as a microphone in the wet end area of the paper machine.

The acoustic sensor is arranged to record environmental sound 600. That recorded environmental sound 600 is arranged to be transmitted as acoustic data to a data processing unit configured to construct a mixed virtual tour for analysis. The acoustic sensor comprises means for transmitting acoustic data to the data processing unit. The means for transmitting acoustic data may be, for example, a transceiver or a transmitter arranged to transmit acoustic data wirelessly or via a wired connection from the sensor to the data processing unit.

The data processing unit configured to construct the mixed virtual tour comprises at least one processor, at least one memory including computer program code for one or more program units and pre-stored audio profiles for different operational states of the paper machinery and means for receiving acoustic data wirelessly or via a wired connection from the acoustic sensor. Pre-stored audio profiles may comprise audio profiles for different operational states of the paper machinery relating, for example, to normal and/or abnormal operational states of different machines of the process machinery and/or for one of the machines. Pre-stored audio profiles may comprise, for example, for a normal state, a start-up state, a shut-down state, an idle state or a malfunction state etc. Means for receiving acoustic data may be, for example, a receiver or a transceiver. An example of the data processing unit is defined more precisely above in context with previous figures.

Thus the data processing unit is configured to receive acoustic data from the acoustic sensor that records environmental acoustic signal, convert acoustic signals into electrical acoustic data, and transmit the acoustic data to the data processing unit. The data processing unit is configured to determine an acoustic spectrum for received acoustic data and form an audio profile for the acoustic data.

After forming of the audio profiles, the data processing unit analyses the acoustic data by comparing the formed audio profile to pre-stored audio profiles of different operational states. On the basis of the comparison, the data processing unit may determine an operational state of the machine around the acoustic sensor. If it determines that the formed audio profile is equivalent to an operational state that indicates malfunction of the machine, the data processing unit is arranged to play the acoustic data in the wet end view of the mixed image virtual tour corresponding the place in the real paper machinery environment, wherein the acoustic sensor is positioned. Thus, the mixed image virtual tour is further augmented by audio signal data in addition to real-time video stream data when the data processing unit defines i.e. determines when analysing the acoustic sensor data that there may be a malfunction in the paper machinery environment. The data processing unit may also indicate to the user about the malfunction. The malfunction is an example of a deviation.

Figure 7:
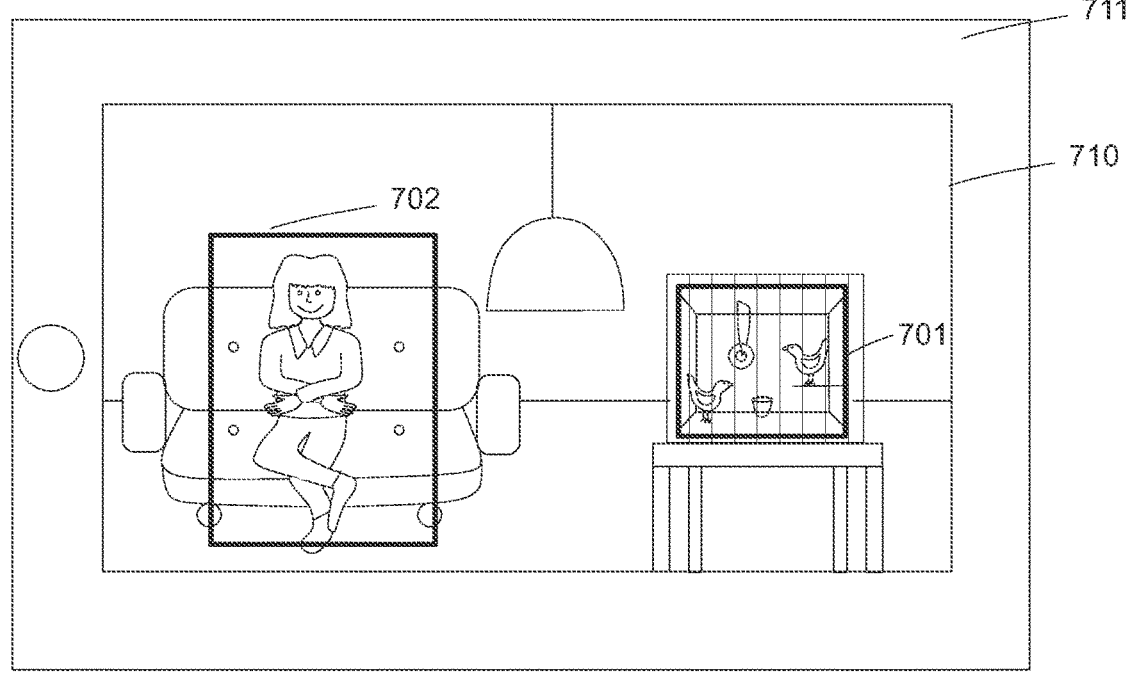
FIG. 7 shows an example embodiment, in which a view of a mixed image virtual tour is shown.

FIG. 7 shows an example of a living room view 710 of a mixed image virtual tour on a user terminal 711. A first real-time video camera is arranged to capture image data of a first target object, which in this example is a bird cage. The captured image data of the bird cage is transmitted to the data processing unit constructing the mixed image virtual tour. In this view 710 real-time video stream of a field of view area 701 of the first real-time video camera is overlayed on the corresponding bird cage area of the living room view 710 of the virtual tour so that the real-time video stream of the real-time video camera is shown on the living room view 710 of the mixed image virtual tour.

In the real living room, also a second real-time video camera is arranged to capture image data. The second real-time video camera is capturing image data of a second target object, which in this example is a couch. The captured image data of the second video camera is transmitted to the data processing unit constructing the mixed image virtual tour. This real-time video stream of the second field of view area 702 of the second real-time video camera is shown on the living room view 710 of the mixed image virtual tour, only when the data processing unit when analysing captured image data of the second target object detects that there is a person or something else that does not belong on the couch i.e. it detects a deviation, because the couch should be non-occupied, and the deviation is in this example something overlaying on the couch. In a case of a detected deviation, real-time image data of the second field of view area 702 of the second video camera is overlayed on the living room view 710 of the mixed image virtual tour, more precisely it overlayed on the couch as a pop-up image data.

The rest of the living room view 710 is old and static, but the bird cage area and the couch area, when a deviation is detected, comprise live image data received from the cameras arranged to capture image data in the real living room environment.

The deviations which may trigger displaying of image data of one or more cameras on top of one or more views of a mixed image virtual tour are not limited to the examples given above, but a deviation may be any change, anomaly, or defect that may be detected when analysing image data.

FIG. 8 shows a flow chart of a computer implemented method 800 for augmenting a virtual tour to a mixed image virtual tour if a deviation is detected. In step 810 a previously captured virtual tour data of a location is obtained, in step 820, real-time image data of a target object located within a field of view area of a camera, which target object is located in the same location wherein the virtual tour data was captured is received, in step 830, the real-time image data for detecting a deviation is analysed, and in step 840, if the deviation is detected, the real-time image data is overlayed on an area of a virtual tour view for forming a mixed image virtual tour data, which area of the virtual tour view corresponds the field of view area.

Audio sensor according to the disclosed embodiments capturing i.e. recording real-time acoustic data comprise at least circuitry and electronics for recording environmental acoustic sound i.e. data, converting acoustic data into electrical signals and transmitting this acoustic data. Cameras according to the invention comprise at least circuitry and electronics for capturing real-time images or video stream and transmitting image data.

It should be noted that the number of cameras arranged to provide real-time image data of target objects to be overlayed on views of a mixed image virtual tour with or without deviation detection may vary. There may be only one camera or there may be a plurality of cameras. Also the number of cameras, which image data is arranged to be overlayed on views of the mixed image virtual tour may also vary. There may be several cameras capturing image data of the target objects, but it is possible that image data of only one, two etc. field of view areas are shown on top of the view. Also the shown image data of field of view areas or additional information may be changeable by a user, or it may depend, for example, on time of day, season, user profile, outdoor temperature, indoor temperature, humidity, etc. So that only the most relevant additional information is overlayed on the view.

It is obvious that the aspects of the disclosed embodiments are not limited solely to the above-presented embodiments, but it can be modified within the scope of the appended claims.

The invention claimed is:

1. A computer implemented method, comprising:
obtaining a previously captured image data of a virtual tour of a location,
receiving real-time image data of a target object located within a field of view area of a camera, which target object is located in a same location wherein the previously captured image data was captured,
analyzing the real-time image data for detecting a deviation,
overlaying the real-time image data of the target object on a corresponding area of the target object in a virtual tour view for forming a mixed image virtual tour data, only if the deviation is detected, otherwise the virtual tour view of the target object is shown,
receiving real-time acoustic data captured by an audio sensor in the location, analyzing the received acoustic data for detecting a malfunction, and
playing the real-time acoustic data in an area of the mixed image virtual tour view corresponding to the location of the audio sensor or its surroundings in the location if the malfunction is detected for further augmenting the mixed image virtual tour by real-time acoustic data;
wherein the method further comprises:
continuously overlaying real-time image data of a first target object on a corresponding area of the virtual tour view irrespective of detecting a deviation; and
overlaying real-time image data of a second target object on a corresponding area of the virtual tour view only upon detecting a deviation in analysis of image data of the second target object, the overlay being presented as a pop-up image.

2. The computer implemented method according to claim 1, wherein the previously captured image data is static image data of a real environment of the location.

3. The computer implemented method according to claim 1, wherein the previously captured image data comprises images captured by a person walking through the location, and which previously captured image data is obtained from a camera, a memory or a cloud storage, and wherein the method further comprises: constructing the previously captured image data as a virtual tour by a data processing unit.

4. The computer implemented method according to claim 1, wherein the previously captured image data is a ready-constructed virtual tour.

5. The computer implemented method according to claim 1, wherein the method further comprises:
obtaining additional information about the location,
analyzing the additional information for detecting a deviation, and
overlaying the additional information on the mixed image virtual tour view if a deviation is detected.

6. The computer implemented method according to claim 1, wherein the real-time image data is real-time video stream or frequently captured real-time images.

7. The computer implemented method according to claim 1, wherein the method further comprises:
capturing real-time image data configured to be overlayed on areas of the virtual tour view by more than one cameras.

8. The computer implemented method according to claim 1, wherein a time point of a view of the mixed image virtual tour is changeable to a previous time point.

9. A camera system comprising at least one camera and a data processing unit, wherein the data processing unit is configured to obtain a previously captured image data of a virtual tour of a location, and which the at least one camera is configured to capture real-time image data of a target object located within a field of view area of the at least one camera, and which target object is located in the same location wherein the previously captured image data was captured; and
wherein the data processing unit is further configured to
analyze the real-time image data for detecting a deviation and overlay the real-time image data of the target object on a corresponding area of a virtual tour view for forming a mixed image virtual tour, only if the deviation is detected, otherwise the virtual tour view of the target object is shown, and which the system further comprises an audio sensor configured to capture acoustic data in the location and to transmit the captured acoustic data to the data processing unit for analysis, wherein if a malfunction is detected, the real-time acoustic data is configured to be played in an area of the mixed image virtual tour view corresponding to the location of the audio sensor or its surroundings in a real environment; and wherein the data processing unit is further configured to:
continuously overlay real-time image data of a first target object on a corresponding area of the virtual tour view irrespective of detecting a deviation; and
overlay real-time image data of a second target object on a corresponding area of the virtual tour view only upon detecting a deviation in analysis of image data of the second target object, the overlay being presented as a pop-up image.

10. The system according to claim 9, wherein the data processing unit is further configured to obtain additional information about the location, analyze the additional information and overlay the additional information on the mixed image virtual tour view if the data processing unit detects a deviation.

11. The system according to claim 9, wherein the system comprises more than one cameras.

12. The system according to claim 9, wherein a time point of a view of the mixed image virtual tour is changeable to a previous time point.

13. A computer program product, stored on a non-transitory computer readable medium and executable in a computing device, wherein the computer program product comprises instructions to perform the method according to claim 1.

\*    \*    \*    \*    \*